Aug. 4, 1970  D. F. PARKER  3,522,479
PROTECTIVE ELECTRICAL SYSTEMS FOR MOBILE MACHINES
Filed Dec. 15, 1967  2 Sheets-Sheet 1

INVENTOR
DOUGLAS F. PARKER
BY Shanley & O'Neil
ATTORNEYS

INVENTOR
DOUGLAS F. PARKER

United States Patent Office 3,522,479
Patented Aug. 4, 1970

3,522,479
**PROTECTIVE ELECTRICAL SYSTEMS
FOR MOBILE MACHINES**
Douglas F. Parker, Hobbs, N. Mex., assignor to Kerr-
McGee Corporation, a corporation of Delaware
Filed Dec. 15, 1967, Ser. No. 690,841
Int. Cl. H02h 1/02, 7/00
U.S. Cl. 317—18                           10 Claims

ABSTRACT OF THE DISCLOSURE

Apparatus for continuous low-voltage monitoring of continuity of a ground wire in mobile machine trailing cable, and for detecting a ground fault in a phase conductor. A Y-connected power transformer secondary having a grounded neutral supplies power to the machine through phase conductors in the trailing cable. An autotransformer carried by the mobile machine is connected to the phase conductors and tapped to provide a low reference voltage. The tap is connected to the ground wire, which is connected to the neutral of the power transformer. In one form of the apparatus, two parallel relay coils are interposed between the tap and the ground wire. When a discontinuity appears in the ground wire, one coil is deenergized and actuates an alarm signaling the opening of the ground circuit. When a ground fault occurs in a phase conductor, the other relay coil is energized and activates an alarm signaling the presence of the fault. In a modification, a warning lamp is interposed between the tap and the ground wire instead of the relay coils. When the ground wire becomes discontinuous, the lamp goes out, signaling the opening of the ground circuit. When a ground fault occurs in a phase conductor the lamp becomes very bright, signaling the presence of the fault.

BACKGROUND OF THE INVENTION

This invention pertains to protective systems for mobile electrical apparatus. In its more particular aspects, the invention relates to apparatus for monitoring the continuity of a ground wire connection to a mobile machine, and for detecting a ground fault in a power conductor to the machine.

High voltage A.C. mobile equipment employing trailing cable for receiving electrical power must be grounded for safety reasons. Grounding of such apparatus, which is widely used in the mining industry, is usually effected by a ground wire contained in the trailing cable and connecting the machine frame to ground at the power center which supplies power to the machine.

Repeated flexure of the trailing cable, which occurs in normal service, or other damage to the cable or connections, may destroy the continuity of the ground wire to unground the machine and thereby create a hazardous condition. Various prior art procedures have been developed for checking the integrity of the ground connection. Such procedures are unsatisfactory because they introduce full phase voltage into the machine frame, or are only performed at periodic intervals, or require the use of a ground check wire in the trailing cable.

Accordingly, a main object of the invention is the provision of a continuous low-voltage ground-line monitoring system which dispenses with necessity for a ground check wire.

Another object of the invention is the provision of an improved ground-line monitoring system which includes features for detecting a ground fault in a phase conductor to the mobile machine.

Other objects of the invention will appear from the following detailed description which, when considered in conjunction with the accompanying drawings, discloses a preferred embodiment of the invention for purposes of illustration only.

BRIEF DESCRIPTION OF THE DRAWINGS

In the drawings, where similar reference characters denote similar elements throughout the several views.

DESCRIPTION OF THE PREFERRED EMBODIMENT

Figure 1:
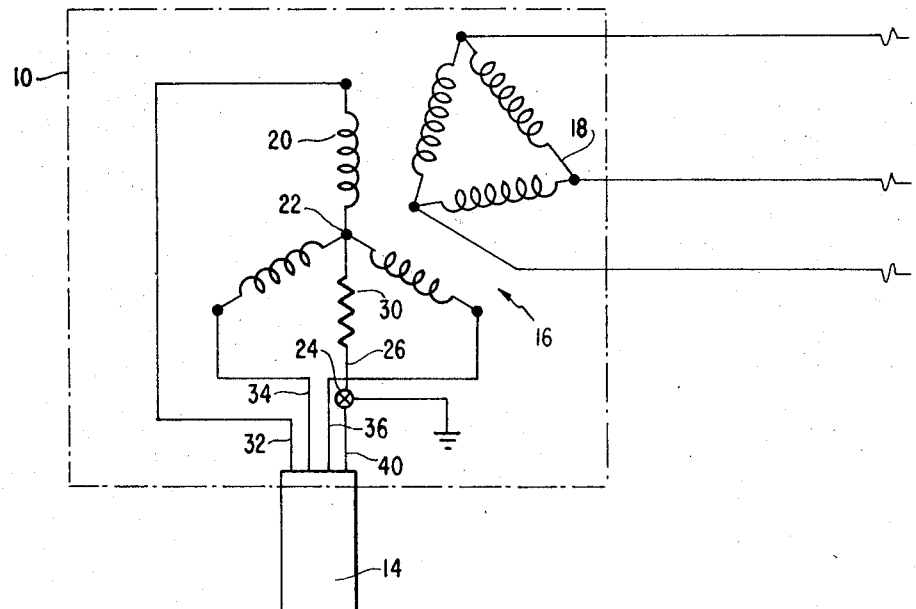
FIG. 1 is a schematic circuit diagram of a protective electrical system embodying the principles of the invention.
Figure 1:
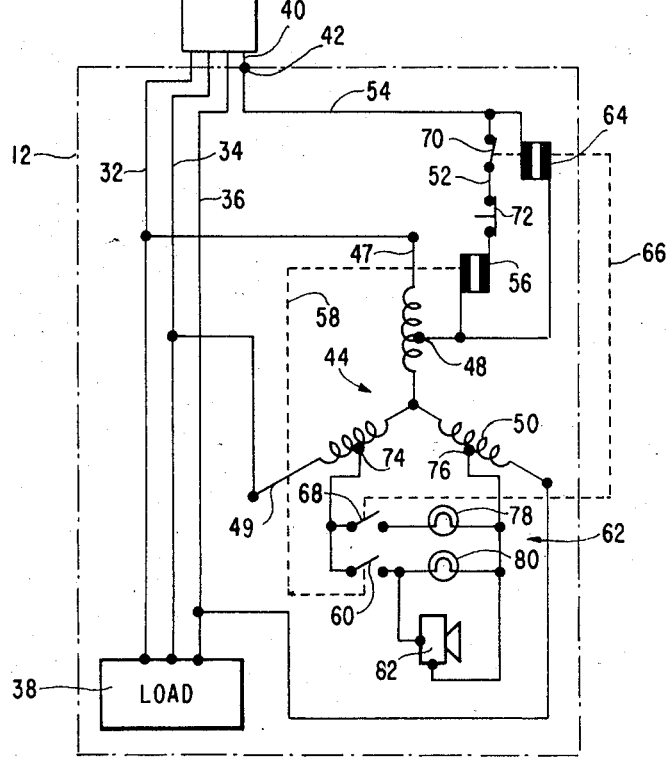

In FIG. 1, a power center 10 supplies electrical power to a mobile mining machine 12 through trailing cable 14. Power center 10 includes a power transformer which is generally indicated at 16 and has a delta-connected primary winding 18 connected to a suitable power source not shown. Power transformer 16 includes a Y-connected secondary winding 20, which provides a line voltage of, for example, about 480 volts, three-phase A.C., to power mobile machine 12. Power center 10 may also include conventional circuit breakers and allied apparatus, not shown.

Neutral connection 22 of secondary winding 20 is connected to grounding stud 24 by conductive wire 26. A ground-current-limiting resistor 30 is interposed in conductor 26. Phase conductors 32, 34, 36, extend from the terminals of secondary winding 20 through trailing cable 14 and are connected to electrical load 38 on mobile machine 12. Load 38 may, for example, include the machine drive motor and/or motors driving mining apparatus carried by the machine. A ground wire 40 is connected to conductor 26 and ground stud 24, extends through trailing cable 14, and is connected to the frame of mobile machine 12 at 42.

An autotransformer 44 carried by mobile machine 12 has legs 47, 49, 50 connected to phase conductors 32, 34, 36 respectively. Leg 47 of autotransformer 44 is tapped at 48 so that a voltage safe for human contact and substantially lower than line voltage is obtained through the tap. For example, the voltage obtained through the tap may be about 30 volts.

Low-voltage tap 48 is connected to ground wire 40 by conductive wires 52, 54. In this fashion, a reference voltage is established across ground wire 40 between tap 48 of autotransformer 44 and the neutral 22 of secondary winding 20 of power transformer 16. Relay coil 56 is interposed in conductor 52 and is connected by mechanical linkage 58, which may be any suitable type of conventional design, to operate a switch 60 in an alarm circuit generally indicated at 62. Another relay coil 64 is arranged in parallel circuit relationship with coil 56 and is connected by mechanical linkage 66 to operate switch 68 in alarm circuit 62. Coil 64 is also mechanically connected to operate switch 70, which is interposed in conductor 52 and is opened upon energization of coil 64. A test switch 72 is connected in series circuit relationship with coil 56 in conductor 52. Coil 56 is energized by the reference voltage, but the reference voltage is below the pickup level or coil 64.

Alarm circuit 62 extends between taps 74, 76 on legs 49, 50 respectively of autotransformer 44. Visible alarms in the form of warning lamps 78, 80 are arranged in parallel circuit relationship in the alarm circuit and are respectively serially connected to switches 68, 60. An audible alarm in the form of a horn 82 is connected in parallel with warning light 80.

In operation, with the reference voltage standing between the autotransformer tap 48 and the neutral 22 of the secondary winding of the power transformer 16, relay coil 56 is energized and switch 60 is open. Relay coil 64 is deenergized, and switch 68 is open. Whenever a discontinuity appears in ground wire 40, opening the ground circuit, coil 56 is deenergized, responding to the presence of the discontinuity. Deenergization of coil 56 closes switch 60 to actuate warning lamp 80 and horn 82 to signal the existence of the discontinuity in the ground wire.

If a ground fault occurs in a phase conductor, the voltage between the autotransformer tap 48 and neutral 22 of power transformer secondary winding 20 rises above the reference voltage and energizes relay coil 64. Energization of coil 64 closes switch 68 to actuate warning lamp 78 to signal the existence of the ground fault. Energization of coil 64 also opens switch 70, which deenergizes coil 56. Deenergization of coil 56 closes switch 60 to actuate horn 82 to audibly signal the malfunction. Since both lamps 78, 80 are illuminated when horn 82 sounds, the operator can determine that the malfunction is a ground fault rather than ungrounding.

Figure 2:
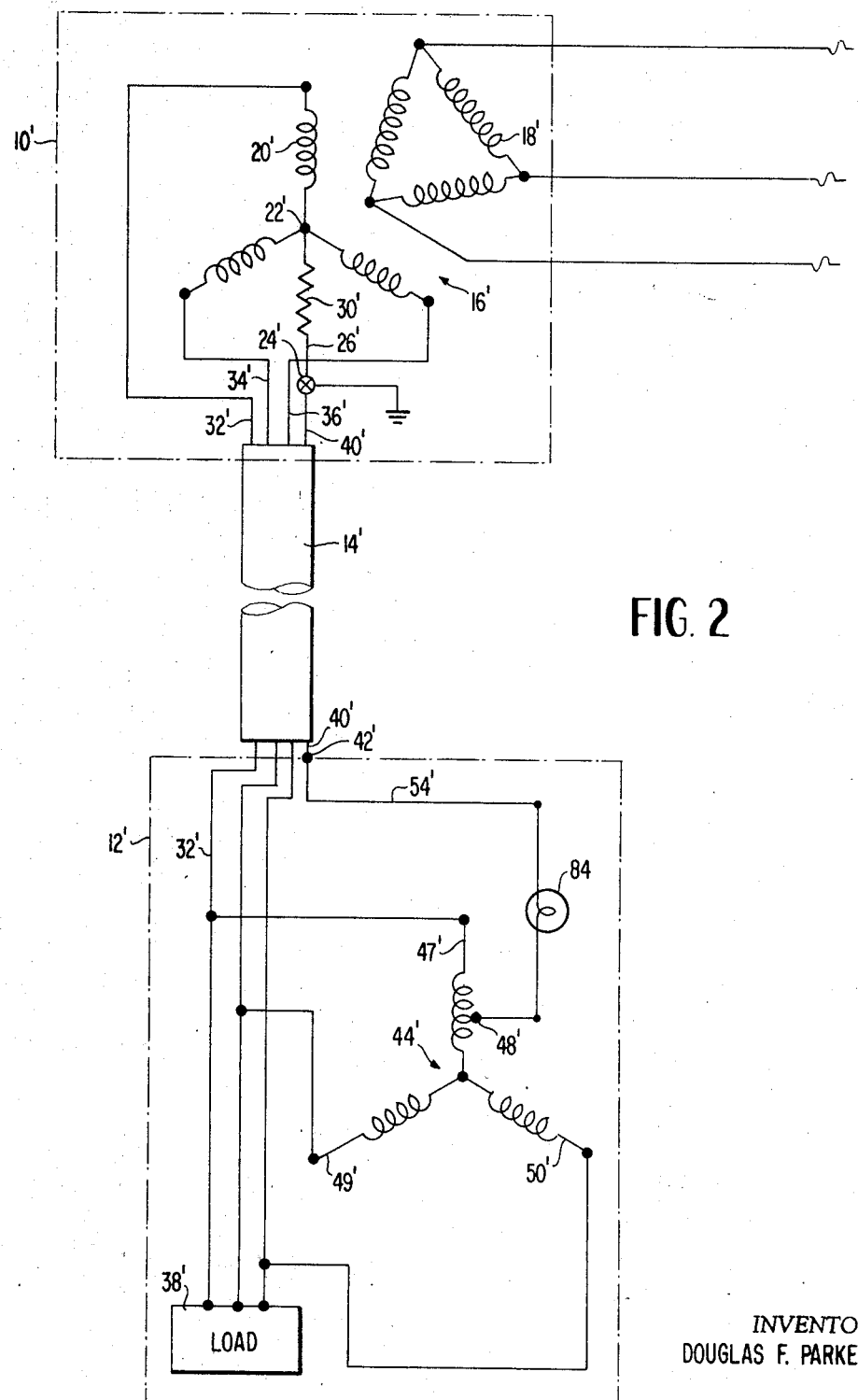
FIG. 2 is a schematic circuit diagram of a modified form of the electrical system of FIG. 1.

In the modification of FIG. 2, elements corresponding to elements illustrated in FIG. 1 are indicated by primed reference numerals. Autotransformer tap 48' is connected to ground wire 40' across a warning lamp 84, which is energized by the reference voltage. When a discontinuity appears in the ground wire, lamp 84 is extinguished, thereby signaling the existence of the discontinuity. When a ground fault occurs in a phase conductor, causing the voltage between tap 48' and neutral 22' to rise above the reference voltage, lamp 84 is energized to a relatively higher level of illumination, thereby signaling the presence of the fault.

Apparatus according to the invention is highly advantageous in providing continuous monitoring of the integrity of the ground circuit to the mobile machine. With continuous monitoring, the operator is warned the instant that the ground connection is opened, and need not rely upon periodic inspections to determine ground line continuity and risk exposure to a hazardous condition appearing between ground line continuity checks. Further, in using low monitoring voltages, the inventive apparatus avoids exposure of testing personnel and passersby to full phase voltage in the machine frame.

Moreover, the foregoing advantages have been obtained without use of a ground check wire, the presence of which adds to the bulk and cost of trailing cable and presents problems in that it also may become discontinuous and provide an erroneous indication of ground line discontinuity. Finally, inventive protective electrical systems advantageously include features for warning of the presence of a ground fault in a phase conductor.

Although the invention has been described in connection with a preferred embodiment, modifications of that embodiment can be made without departing from the spirit of the invention. Such modifications are within the scope of the invention as defined by the appended claims.

What is claimed is:

1. A protective electrical system, comprising
a mobile machine including a frame and an electrical load,
a power transformer including a secondary winding providing line voltage and having a neutral,
power conducting means forming a continuous electrical connection between the secondary winding and the load to operate the mobile machine,
the power conducting means including a plurality of phase conductors extending through a cable,
reference voltage-providing means carried by the mobile machine and electrically connected to the phase conductors for providing from the phase conductors a reference voltage substantially lower than the line voltage, and
means forming a continuous circuit electrically connecting the reference voltage-providing means and the neutral during operation of the mobile machine, the circuit including
a ground wire having one end portion electrically connected to the machine frame and extending through the cable to another end portion electrically connected to a ground,
first conductive means forming a continuous electrical connection between the reference voltage-providing means and the one end portion of the ground wire during operation of the mobile machine, and
second conductive means forming a continuous electrical connection between the neutral and the other end portion of the ground wire during operation of the mobile machine,
one of the first and second conductive means including responsive means energized by the reference voltage and de-energized upon occurrence of a discontinuity in the ground wire for responding to the presence of the discontinuity.

2. The protective electrical system of claim 1, the responsive means being carried by the mobile machine and forming a portion of the first conductive means.

3. The protective electrical system of claim 2, including signaling means carried by the mobile machine and actuated by deenergization of the responsive means, for signaling the existence of the discontinuity in the ground wire, the responsive means comprising a relay coil.

4. The protective electrical system of claim 3, including a second relay coil in parallel circuit relationship with the first-named relay coil in the circuit, the second relay coil being non-responsive to the reference voltage and being energized by a voltage greater than the reference voltage upon occurrence of a ground fault in a phase conductor, and second signaling means carried by the mobile machine and actuated by energization of the second relay coil for signaling the existence of the ground fault.

5. The protective electrical system of claim 4, the reference voltage-providing means comprising
an autotransformer having a leg electrically connected to each phase conductor, and
means forming a low-voltage tap on one of the autotransformer legs.

6. The protective electrical system of claim 5, including means forming a second circuit electrically connecting a tap on a second leg of the autotransformer to a tap on a third leg of the autotransformer, the first-named and the second signaling means being electrically connected in parallel circuit relationship in the second circuit.

7. The protective electrical system of claim 6, the second circuit including
a first switch connected in series circuit relationship with the first-named signaling means, and being operatively connected to the first relay coil to open when the first relay coil is energized and to close when the first relay coil is deenergized, and
a second switch connected in series circuit relationship with the second signaling means, and being operatively connected to the second relay coil to close when the second relay coil is energized and to open when the second relay coil is deenergized.

8. The protective electrical system of claim 2, the second conductive means including a ground-current-limiting resistor serially connected between the neutral and the other end portion of the ground wire.

9. The protective electrical system of claim 2, the responsive means comprising signaling means serially connected between the reference voltage-providing means and the ground wire for signaling the existence of the discontinuity in the ground wire.

10. The protective electrical system of claim 9, the signaling means comprising a lamp.

References Cited

UNITED STATES PATENTS

| | | | |
|---|---|---|---|
| 1,722,419 | 7/1929 | Heinisch et al. | 317—45 |
| 2,880,377 | 3/1959 | Buckingham et al. | 317—45 XR |
| 3,158,806 | 11/1964 | Conrad | 317—44 XR |
| 3,196,316 | 7/1965 | Crom | 317—18 |
| 3,335,324 | 8/1967 | Buckeridge | 317—18 |

WILLIAM M. SHOOP, Jr., Primary Examiner

U.S. Cl. X.R.

317—45